T. L. MARTIN.
AXLE SPINDLE.
APPLICATION FILED JUNE 1, 1908.
900,562.
Patented Oct. 6, 1908.
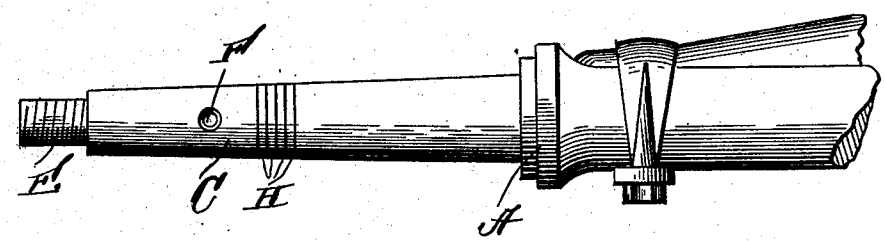
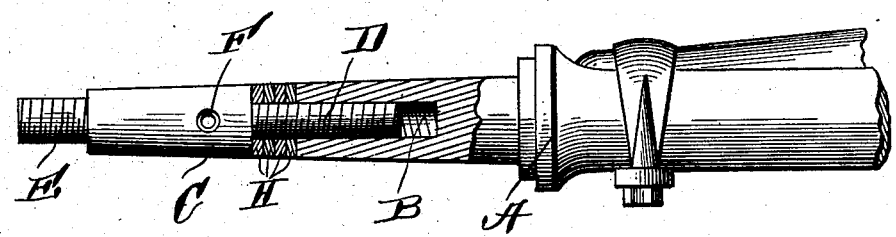
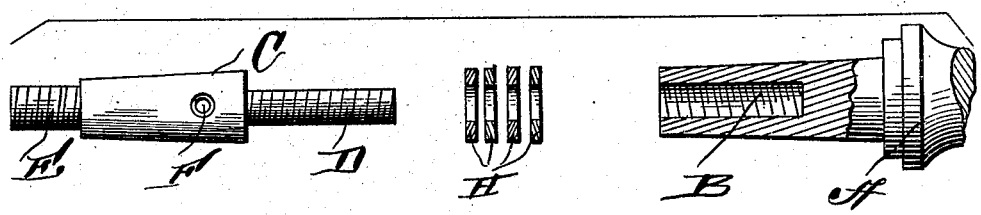

UNITED STATES PATENT OFFICE.

THOMAS L. MARTIN, OF WRIGHTSVILLE, GEORGIA.

AXLE-SPINDLE.

No. 900,562.  Specification of Letters Patent.  Patented Oct. 6, 1908.

Application filed June 1, 1908.  Serial No. 436,133.

*To all whom it may concern:*

Be it known that I, THOMAS L. MARTIN, a citizen of the United States, residing at Wrightsville, in the county of Johnson and State of Georgia, have invented certain new and useful Improvements in Axle-Spindles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sectional axles for the running gear of vehicles and the object in view is to produce a means whereby the wear coming upon the axle box may be taken up.

The invention comprises various details of construction, combinations and arrangements of parts which will be hereinafter fully described and then specifically defined in the appended claims.

My invention is illustrated in the accompanying drawings, in which:—

Figure 1 is a side elevation of an axle embodying the features of my invention. Fig. 2 is a central sectional view through the axle, and Fig. 3 is a view showing the parts disassembled.

Reference now being had to the details of the drawings by letter, A designates the axle of a vehicle having a threaded bore B in the end thereof.

C designates an axle section having a contracted threaded portion D of such a diameter as to enter and engage the threads in the hole in the axle A. E designates the opposite threaded end of the section C adapted for the reception of the usual retaining nut for holding the wheel upon the axle. Said section C is provided with a hole F in which any suitable instrument may be inserted for the purpose of turning the section.

H—H designate washers which have openings of sufficient size to receive the screw D and the diameters of said washers are similar in size to the diameter in the section C and flush with the circumference thereof when adjusted in place in the manner shown in the drawings.

In operation, as many washers as may be desired to use are placed over the threaded screw D, after which the latter is screwed into the hole in the end of the axle A. When the contracted threaded portion D is screwed up so as to hold the washers tightly between the section C and the outer end of the axle A, an axle bearing surface is presented to the inner surface of the box of a wheel. When the box or the shouldered portion of the axle becomes worn, one or more washers may be removed from the threaded screw in the axle section C in order that the nut when fitted to the opposite end of the section C may come in sufficiently close proximity to the end of the boxing to prevent any shocking of the wheel.

What I claim to be new is:—

In combination with an axle having a threaded aperture in the end thereof, an axle section having a screw engaging the threaded end of the axle, and washers interposed between the axle and said section, as set forth.

In testimony whereof I hereunto affix my signature in the presence of two witnesses.

THOMAS L. MARTIN.

Witnesses:
 THOMAS L. HARRIS,
 ROY PAGE.